United States Patent [19]
Wallis

[11] Patent Number: 5,318,281
[45] Date of Patent: * Jun. 7, 1994

[54] SELF CONTAINED GAS SPRING AND DIE CYLINDER

[76] Inventor: Bernard J. Wallis, 2215 Dacosta, Dearborn, Mich. 48128

[*] Notice: The portion of the term of this patent subsequent to Dec. 22, 2009 has been disclaimed.

[21] Appl. No.: 926,926

[22] Filed: Aug. 7, 1992

Related U.S. Application Data

[63] Continuation-in-part of Ser. No. 783,206, Oct. 28, 1991, Pat. No. 5,172,892.

[51] Int. Cl.⁵ .............................................. F16F 5/00
[52] U.S. Cl. .................................. 267/119; 267/64.28; 267/130
[58] Field of Search ............... 267/119, 120, 124, 129, 267/130, 64.28; 277/29

[56] References Cited

U.S. PATENT DOCUMENTS

| | | | |
|---|---|---|---|
| 3,079,897 | 5/1963 | Kirsch | 267/119 |
| 3,279,781 | 10/1966 | Rumsey | 267/64.28 |
| 3,281,138 | 10/1966 | Oster | 267/64.28 |
| 3,694,111 | 9/1972 | Braun | 267/124 |
| 3,923,294 | 12/1975 | Gold et al. | 267/119 |
| 4,550,899 | 11/1985 | Holley | 267/130 |
| 4,583,722 | 4/1986 | Wallis | 267/119 |
| 4,635,908 | 1/1987 | Ludwig | 267/129 |
| 4,664,362 | 5/1987 | Hennells | 267/119 |
| 4,741,518 | 5/1988 | Wallis | 267/75 |
| 4,742,997 | 5/1988 | Wallis | 267/119 |
| 4,813,655 | 3/1989 | Hennells | 267/119 |
| 4,815,718 | 3/1989 | Kadis | 267/130 |
| 5,172,892 | 12/1992 | Wallis | 267/119 |

FOREIGN PATENT DOCUMENTS 2188698 10/1987 United Kingdom ............. 267/62.28

*Primary Examiner*—Andres Kashnikow
*Assistant Examiner*—Chris Schwartz
*Attorney, Agent, or Firm*—Barnes, Kisselle, Raisch, Choate, Whittemore & Hulbert

[57] ABSTRACT

A self contained gas spring comprising a cylindrical housing having a closed end, an open end and a cylindrical bore. A cylindrical sleeve extends into the bore of the housing. The sleeve has at least a portion thereof forming an internal cylindrical surface. A piston rod extends through an opening in the sleeve and has a piston contacting the cylindrical surface. A portion of the sleeve defines a first space between the sleeve and the bore of the housing. The first space communicates with a second space between the piston end of the piston rod and the closed end of the housing. A charging valve is provided in the closed end of said housing for charging the space at the piston end of said piston rod and the space between the sleeve and the housing with gas under pressure. A third axial space is provided between the cylindrical surface on the sleeve and the piston rod above the piston and is isolated from the first space and second space. When the gas escapes past seals into the third space a pressure limiting one-way valve comprising an annular groove, circumferentially spaced passages and an annular elastic seal which normally seals the groove relieves pressure in the third space when it exceeds the pressure in the first space, the annular seal is tensioned such that at least a portion thereof is flexed out of engagement with the diverging surfaces to vent the third space into the first space.

9 Claims, 5 Drawing Sheets

SELF CONTAINED GAS SPRING AND DIE CYLINDER

This application is a continuation-in-part of application Ser. No. 07/783,206, filed Oct. 28, 1991, now U.S. Pat. No. 5,172,892.

This invention relates to self contained gas spring.

BACKGROUND AND SUMMARY OF THE INVENTION

In presses and dies, it has been common to utilize die cylinders which communicate with a manifold and function as die springs. It has also been suggested that self contained gas springs be provided as shown in U.S. Pat. Nos. 4,742,997 and 4,741,518.

A major consideration in connection with the design of the self contained gas springs is that when charged with gas, such as nitrogen, at high pressures on the order of 1000 p.s.i., the normal stroke of the piston therein substantially increases the pressure. Accordingly, the construction of the self contained die cylinder must be constructed to withstand such high pressures. This results in the need to increase the geometric spaces in which the die cylinders are used. It has thus been customary to compromise the design.

Another consideration in connection with self contained gas springs is that in time gas may pass past seals. It has been heretofore suggested that one-way valves be provided to vent the gas from a space into which the gas has passed. Typical constructions that have been suggested comprise a spring loaded ball valve as shown in co-pending application Ser. No. 07/783,206, filed Oct. 28, 1991, now U.S. Pat. No. 5,172,892 incorporated herein by reference.

Such a construction is difficult to make and assemble as well as calibrate for desired venting.

Among the objectives of the present invention are to provide a self contained gas spring which is functional and operates at relatively high pressures; which incorporates a pressure relief construction for venting a space into which gas has passed within the cylinder that is dependable, reliable and can be more readily manufactured; which does not increase the pressure substantially during the movement of the piston within the cylinder; which is compact; and which requires a minimum of maintenance.

In accordance with the invention, a self contained gas spring, comprises a cylindrical housing having a closed end, an open end and a cylindrical bore. A cylindrical sleeve extends into the bore of the housing. The sleeve has at least a portion thereof forming an internal cylindrical surface. A piston rod extends through an opening in the sleeve and has a piston engaging the cylindrical surface. A portion of the sleeve defines a first space between the sleeve and the bore of the housing. The first space communicates with a second space between the piston end of the piston rod and the closed end of the housing. A charging valve is provided in the closed end of said housing for charging the space at the piston end of said piston rod and the space between the sleeve and the housing with gas under pressure. A third axial space is provided between the cylindrical surface on the sleeve and the piston rod above the piston. An annular groove is provided on the outer surface of the sleeve and circumferentially spaced passages extend from the groove to the first space. The groove has sides that converge inwardly toward the passages. An annular elastic seal sealingly engages the converging surfaces of the groove such that when the pressure in the third space exceeds the pressure in the first space, the annular seal is tensioned such that at least a portion thereof is flexed out of engagement with the diverging surfaces to vent the third space into the first space.

In a modified form, the annular groove and annular seal are provided on the piston rod and functions to vent the third space into said first space.

This invention is also applicable to die cylinders having an open end that communicates with a gas manifold.

DESCRIPTION

Figure 1:
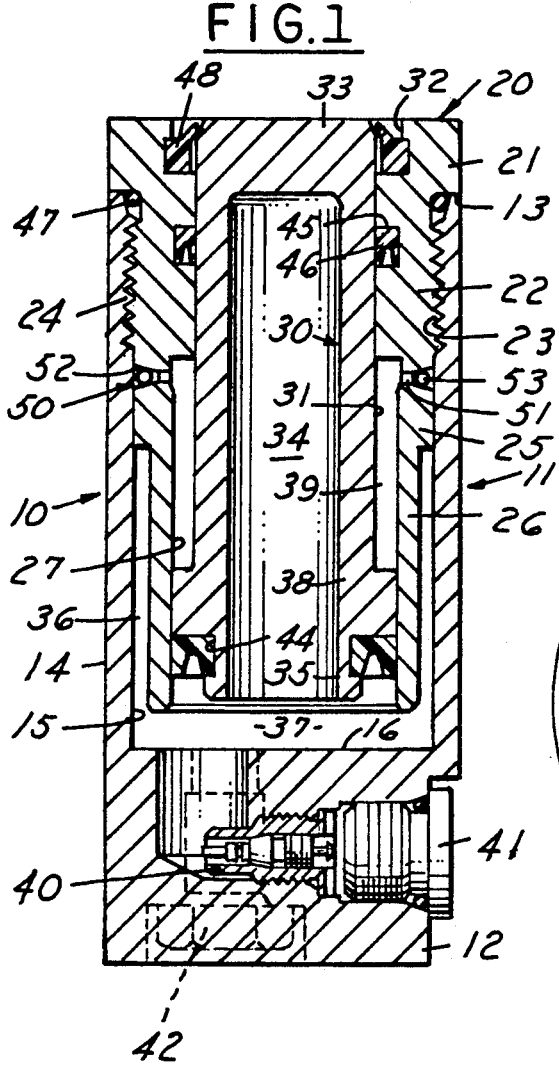
FIG. 1 is a longitudinal sectional view of a gas spring embodying the invention.
Figure 3:
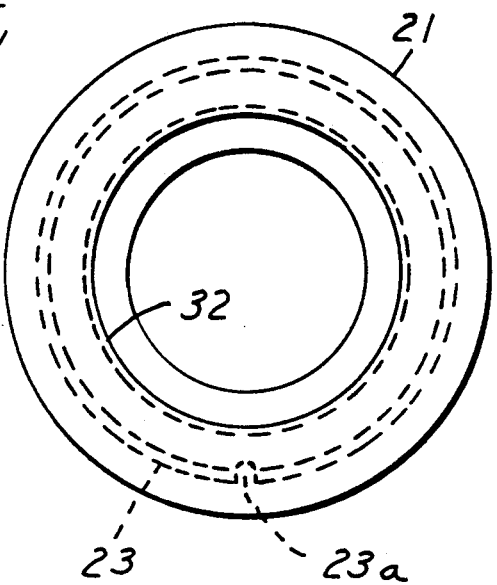
FIG. 3 is a top plan view.

In accordance with the invention, a self contained gas spring 10 comprises a one-piece cylindrical housing 11 having an integral closed end 12 and an open end 13. (FIGS. 1 and 3)

A cylindrical sleeve 20 is inserted into the housing 11 and has an enlarged portion 21 abutting the open end 13 of the housing 11. Alternatively a piston seal may be provided on piston 38. The sleeve 20 has a first intermediate portion 22 that has threads 23 engaging threads 24 on the bore 15 of the housing. The sleeve 20 further includes a second intermediate portion 25 that engages the bore 15.

The sleeve 20 has a lower portion 26 extending from the second intermediate portion 25 to define an inner cylindrical surface 27 which is highly polished. A cylindrical piston rod 30 having a constant diameter outer surface 31 which has a highly polished surface extends through an opening 32 in the sleeve 20. The piston rod has a closed end 33 and a cylindrical bore 34 extending axially toward an open end 35.

Figure 4:
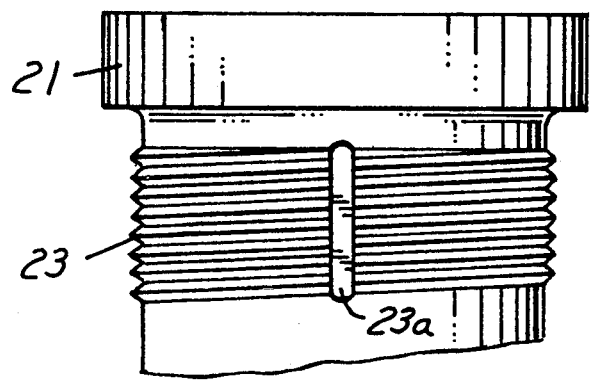
FIG. 4 is a fragmentary elevational view of a part of the gas spring.
Figure 2:
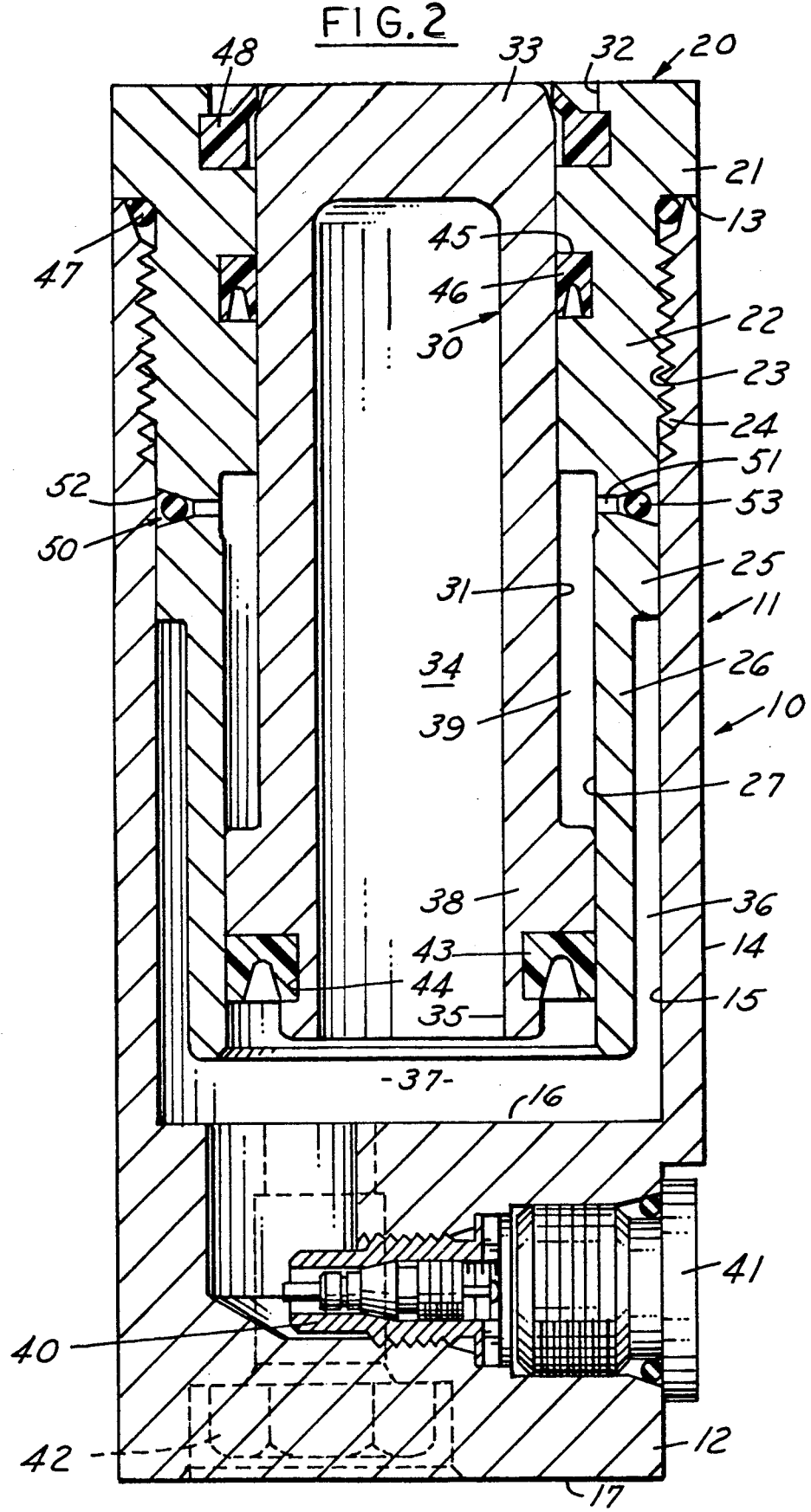
FIG. 2 is a sectional view on an enlarged scale.

The lower portion 26 of the sleeve 20 cooperates with the bore 15 of the housing 11 to define a first cylindrical axial space 36 that communicates with a second space 37 between the lower end 26 of the sleeve and the closed end 12 of housing 11. The piston rod 30 includes an integral piston 38 that has a highly polished cylindrical surface that engages the highly polished cylindrical surface 27 of sleeve 20. The threads have at least one axial space 23a to vent the pressure during disassembly for servicing. (FIG. 4) The cylindrical surface 27, the sleeve 20 and the piston 38 define a third cylindrical space 39, the axial extent of which varies as the piston rod 30 moves axially relative to the sleeve 20.

A charging valve 40 is provided in the closed end 12 of said housing section 11 and extends radially inwardly for charging the space 37 at the piston end 38 of said piston rod 30 and the space 36 between the sleeve 22 and the housing 11 with gas under pressure. A removable plug 41 is threaded into the housing so that the valve 40 is protected from contaminants.

Figure 6:
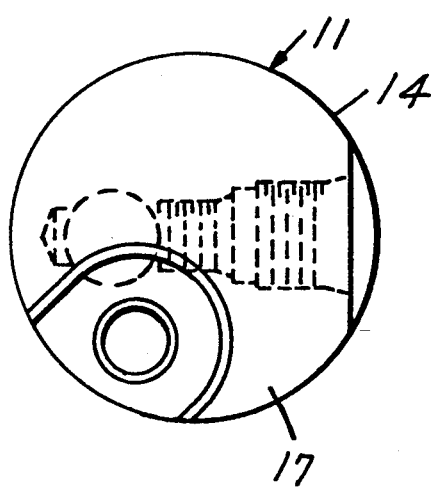
FIG. 6 is a bottom plan view.

A lip seal 48 is provided in the sleeve 20 to limit the entry of dirt and contaminants. The gas spring further includes a safety rupture plug 42 that communicates with the annular space 37 defined by the sleeve 15. (FIG. 6)

The piston 38 is provided with a U-cup annular seal 43 that is retained in a groove 46. Sleeve 20 is provided with an annular recess 45 for a U-cup seal 46. An O-ring seal 47 is provided at the juncture of the sleeve 20 and housing 11.

Figure 5:
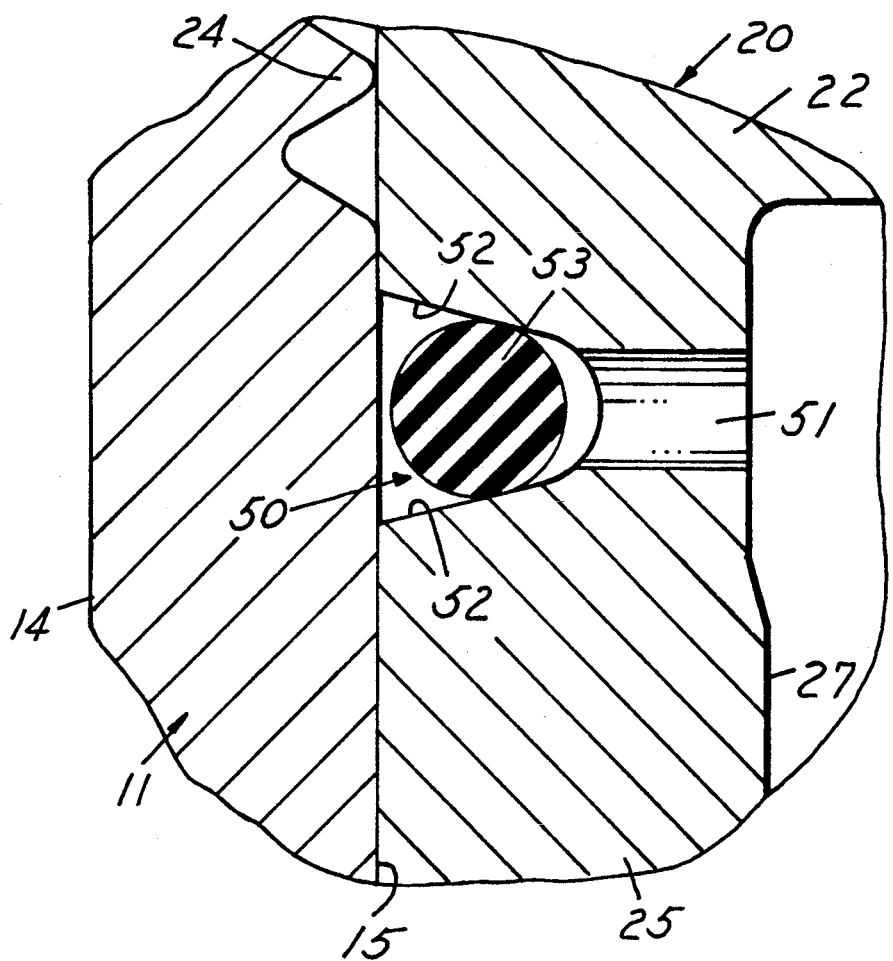
FIG. 5 is a sectional view on a greatly enlarged scale of a portion of the gas spring.

An annular groove 50 is provided on the outer surface of the sleeve and circumferentially spaced passages 51 extend from the groove 50 to the first space 36. The groove 50 has sides 52 that converge inwardly toward the passages 39. (FIG. 5) An annular elastic seal 53 sealingly engages the converging surfaces 54 of the groove 51 such that when the pressure in the third space exceeds the pressure in the first space 36, the annular seal 53 is tensioned such that at least a portion thereof is flexed out of engagement with the diverging surfaces 54 to vent the third space 39 into said first space 37.

Figure 7:
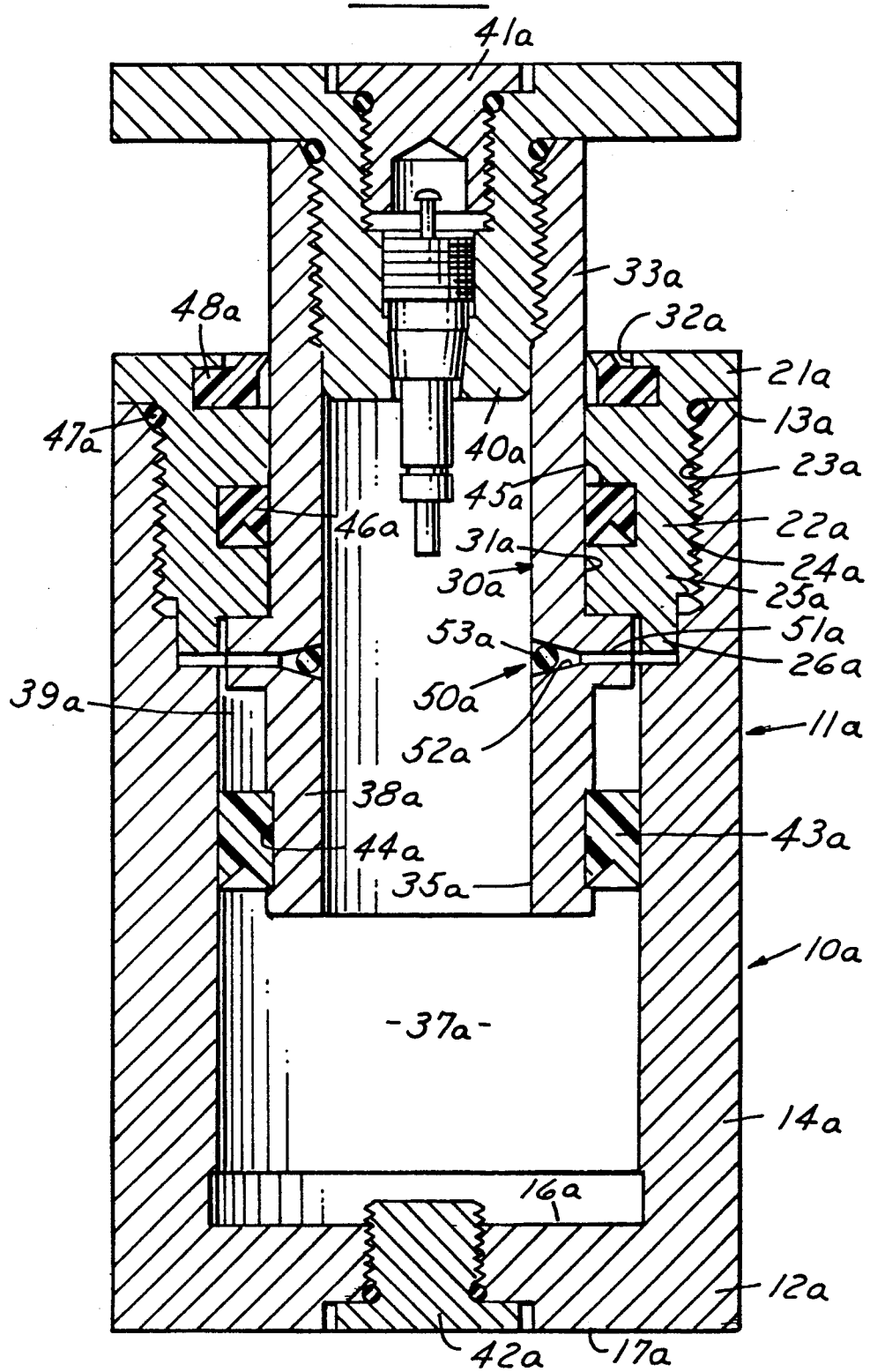
FIG. 7 is a sectional view of a modified form.

In the modified form shown in FIG. 7, the annular groove 50a, passages 51a and annular seal 53a are provided in the wall of the hollow piston rod 30a. It thus functions to vent the third cylindrical space 39a to the first space 37a.

Figure 8:
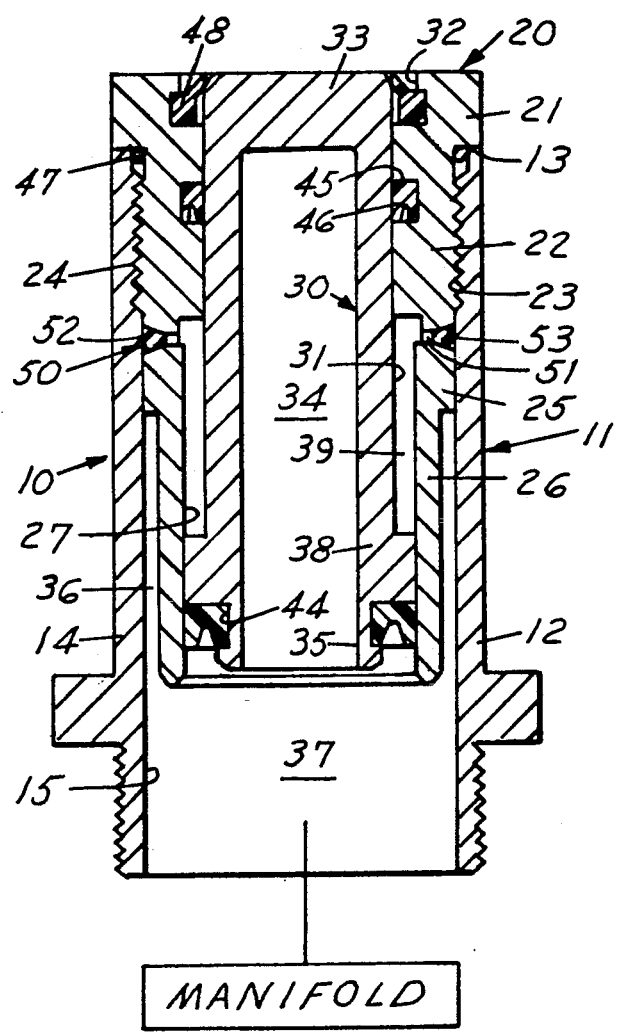
FIG. 8 is a sectional view of the cylinder as applied to a manifold.

Thus, as shown in FIG. 8, the cylinder body 10a is open and threaded into a manifold M having the valve 40 and removable lug 41 mounted therein.

Although the invention of the pressure relief function has been described as being applied to self-contained gas spring, it can be also applied to die cylinders where the closed end is open and communicates with a gas manifold as shown in U.S. Pat. Nos. 4,342,448, 4,529,181 and 4,628,796, incorporated herein by reference.

It can thus be seen that there has been provided a a self contained gas spring or die cylinder which is functional or operates at relatively high pressures; which incorporates a pressure relief construction for venting a space into which gas has passed within the cylinder, that is dependable, reliable and can be more readily manufactured; which does not increase the pressure substantially during the movement of the piston within the cylinder; which is compact; and which requires a minimum of maintenance.

I claim:

1. A gas die cylinder comprising
a cylindrical housing having an open end and a cylindrical bore and a closed end,
a cylindrical sleeve extends into the bore of the housing,
said sleeve having at least a portion thereof forming an internal cylindrical surface,
a piston rod extends through an opening in the sleeve and having a piston on said rod engaging the cylindrical surface,
a portion of the sleeve defines a first space between the sleeve and the bore of the housing,
a second space between a piston end of said rod and said closed end of said housing,
said first space communicating with said second space between the piston end of the piston rod and the closed end of the housing,
a charging valve provided in the closed end of said housing for charging the space at the piston end of said piston rod and the space between the sleeve and the housing with gas under pressure,
a third axial space provided between the cylindrical surface on the sleeve and the piston rod above the piston,
an annular groove provided in one of said outer surface of the sleeve and said piston rod and circumferentially spaced passages extend from said groove to one of said first space, and said second space,
said groove having sides that converge inwardly toward the passages, and
an annular elastic seal sealingly engaging the converging surfaces of the groove such that when the pressure in the third space exceeds the pressure in one of said first space and said second space, said annular seal is tensioned such that at lest a portion thereof is flexed out of engagement with the diverging surfaces to vent the third space into one of said first space and said second space.

2. The gas die cylinder set forth in claim 1 wherein said die cylinder has a closed end such that it is self-contained.

3. The gas die cylinder set forth in claim 1 wherein the die cylinder has an open end adapted to communicate with a gas manifold.

4. A gas die cylinder comprising
a cylindrical housing having an open end and a cylindrical bore and a closed end,
a cylindrical sleeve extends into the bore of the housing,
said sleeve having at least a portion thereof forming an internal cylindrical surface,
a piston rod extends through an opening in the sleeve and having a piston on said rod engaging the cylindrical surface,
a portion of the sleeve defines a first space between the sleeve and the bore of the housing,
a second space between a piston end of said rod and said closed end of said housing,
said first space communicating with said second space between the piston end of the piston rod and the closed end of the housing,
a charging valve provided int he closed end of said housing for charging the space at the piston end of said piston rod and the space between the sleeve and the housing with gas under pressure,
a third axial space provided between the cylindrical surface on the sleeve and the piston rod above the piston,
an annular groove provided in one of said outer surface of the sleeve and said piston rod and circumferentially spaced passages extend from said groove to one of said first space, and said second space,
said groove having sides that converge inwardly toward the passages, and
an annular elastic seal sealingly engaging the converging surfaces of the groove such that when the pressure in the third space exceeds the pressure in one of said first space and said second space, said annular seal is tensioned such that at least a portion thereof is flexed out of engagement with the diverging surfaces to vent the third space into one of said first space and said second space,
said annular groove, passages and annular seal being on said sleeve such as to function to vent said third space into said first space.

5. The gas die cylinder set forth in claim 4 wherein said die cylinder has a closed end such that it is self-contained.

6. The gas die cylinder set forth in claim 4 where the die cylinder has an open end adapted to communicate with a gas manifold.

7. A gas die cylinder comprising
   a cylindrical housing having an open end and a cylindrical bore and a closed end,
   a cylindrical sleeve extends into the bore of the housing,
   said sleeve having at least a portion thereof forming an internal cylindrical surface,
   a piston rod extends through an opening in the sleeve and having a piston on said rod engaging the cylindrical surface,
   a portion of the sleeve defines a first space between the sleeve and the bore of the housing,
   a second space between a piston end of said rod and said closed end of said housing,
   said first space communicating with said second space between the piston end of the piston rod and the closed end of the housing,
   a charging valve provided int he closed end of said housing for charging the space at the piston end of said piston rod and the space between the sleeve and the housing with gas under pressure,
   a third axial space provided between the cylindrical surface on the sleeve and the piston rod above the piston,
   an annular groove provided in one of said outer surface of the sleeve and said piston rod and circumferentially spaced passages extend from said groove to one of said first space, and said second space,
   said groove having sides that converge inwardly toward the passages, and
   an annular elastic seal sealingly engaging the converging surfaces of the groove such that when the pressure in the third space exceeds the pressure in one of said first space and said second space, said annular seal is tensioned such that at least a portion thereof is flexed out of engagement with the diverging surfaces to vent the third space into one of said first space and said second space,
   said annular groove, passages and annular sear being on said piston rod such as to function to vent said third space into said first space.

8. The gas die cylinder set forth in claim 7 wherein said die cylinder has a closed end such that it is self-contained.

9. The gas die cylinder set forth in claim 7 wherein the die cylinder has an open end adapted to communicate with a gas manifold.

* * * * *